(12) United States Patent
Tamoto et al.

(10) Patent No.: US 7,283,646 B2
(45) Date of Patent: Oct. 16, 2007

(54) IMAGE PROCESSING SYSTEM USING ROTATABLE SURVEILLANCE CAMERA

(75) Inventors: Shigetoshi Tamoto, Tokyo (JP); Yoshiyuki Ito, Tokyo (JP); Kazuto Nishiyama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 707 days.

(21) Appl. No.: 10/704,596

(22) Filed: Nov. 12, 2003

(65) Prior Publication Data

US 2004/0096084 A1 May 20, 2004

(30) Foreign Application Priority Data

Nov. 19, 2002 (JP) ............................. 2002-335452

(51) Int. Cl.
*G06K 9/00* (2006.01)
(52) U.S. Cl. .................... 382/104; 348/143; 348/149
(58) Field of Classification Search ............... 382/104, 382/103; 348/143, 148, 149; 345/419
See application file for complete search history.

(56) References Cited

U.S. PATENT DOCUMENTS

| | | | | |
|---|---|---|---|---|
| 4,081,830 A | * | 3/1978 | Mick et al. ................. | 348/155 |
| 5,999,635 A | * | 12/1999 | Higashikubo et al. ...... | 382/104 |
| 5,999,877 A | * | 12/1999 | Takahashi et al. .......... | 701/117 |
| 6,757,008 B1 | * | 6/2004 | Smith .......................... | 348/143 |
| 6,810,132 B1 | * | 10/2004 | Umezaki et al. ............ | 382/104 |

FOREIGN PATENT DOCUMENTS

| | | |
|---|---|---|
| JP | 10-269362 | 10/1998 |
| JP | 11-234658 | 2/1999 |
| JP | P2002-16906 A | 1/2002 |
| JP | 2002-190013 | 7/2002 |
| JP | 2002-218444 | 8/2002 |

OTHER PUBLICATIONS

Linear N-point camera pose determination; IEEE transactions on pattern analysis and machine intelligenc, vol. 21, No. 8 Aug. 1999.*
Shi, Jianbo, And Tomasi, Carlo. "Good Features to Track" IEEE Conference on Computer Vision and Pattern Recognition (CVPR94) Seattle, Jun. 1994.

\* cited by examiner

*Primary Examiner*—Samir Ahmed
*Assistant Examiner*—Claire X. Wang
(74) *Attorney, Agent, or Firm*—McDermott Will & Emery LLP

(57) ABSTRACT

The disclosed image processing system detects the position and speed of a vehicle with high accuracy by accurately measuring the orientation of a rotatable surveillance camera 3 by means of image processing. This system allows mode setting to be switched between an automatic monitoring mode and a manual operation mode. When the mode is switched from the manual operation mode to the automatic monitoring mode, an image processing apparatus 7 recognizes on a screen a plurality of reference points 11 whose locations on a road are given, calculates orientation parameters of the surveillance camera 3 based on the positions of the reference points on the screen, and detects the position and speed of the vehicle based on photographed images of the vehicle using the orientation parameters, thereby detecting phenomena such as traffic congestion and accidents.

11 Claims, 8 Drawing Sheets

IMAGE PROCESSING SYSTEM USING ROTATABLE SURVEILLANCE CAMERA

This application is based on application No. 2002-335452 filed in Japan, the content of which is incorporated hereinto by reference.

BACKGROUND OF THE INVENTION

1. Field of the Invention

The present invention relates to an image processing system that allows automatic monitoring of objects using a rotatable surveillance camera.

2. Description of the Related Art

Stationary automatic surveillance cameras are installed on roads for measuring traffic congestion and the like on the roads, in which image data of the camera are processed to automatically detect phenomena such as traffic congestion.

Meanwhile, there are also movable-type rotational surveillance cameras installed on roads to take pictures at any desired magnification and field of view by manual remote operation.

The automatic surveillance cameras mentioned first are aimed at detecting abnormalities on the roads with high accuracy, and for image processing reasons, their field of view and magnification cannot be changed.

The rotational surveillance cameras mentioned second allow free control of the field of view and magnification and can photograph any object on the road or in the vicinity of the road. However, since they are intended only for viewing pictures, they themselves do not have image processing functions.

In addition, it has been impossible for one surveillance camera to serve as both the automatic surveillance camera and rotational surveillance camera, and therefore they need to be installed separately.

One possible reason for the difficulty to make one surveillance camera serve as both types of cameras is the failure to accurately reproduce the orientation of a surveillance camera when the camera is used again as the automatic surveillance camera after use thereof as the rotational surveillance camera. When the surveillance camera is used as the automatic surveillance camera, since the camera is overlooking the road for a long distance, even a minor difference in orientation leads to a great degradation in the accuracy for detecting physical quantities such as vehicle speed, adversely affecting the detection of phenomena. Reproducing the orientation of the surveillance camera with high accuracy is therefore desired.

Providing a turntable with a mechanism for automatically controlling the position and angle may be one possible idea for accurately setting the orientation of the surveillance camera. However, this complicates the structure of the turntable and increases the cost, reducing the practicality.

BRIEF SUMMARY OF THE INVENTION

It is therefore an object of the present invention to provide an image processing system capable of detecting physical quantities with high accuracy with the use of a rotatable surveillance camera by allowing mode setting to be switched between an automatic monitoring mode for automatically monitoring an object and a manual remote operation mode that enables acquisition of a picture taken by the surveillance camera with any desired field of view by manual remote operation, and allowing the orientation of the camera to be accurately measured by means of image processing in the automatic monitoring mode.

An image processing system according to the present invention comprises a surveillance camera rotatably mounted on a turntable, an image processing apparatus and a camera operation section, wherein the system allows mode setting to be switched between an automatic monitoring mode for automatically monitoring an object by means of image processing and a manual operation mode that enables acquisition of a picture taken by the surveillance camera with any desired field of view by manual remote operation from the camera operation section, and the image processing apparatus in the automatic monitoring mode has a function of recognizing on a screen a plurality of reference points whose locations on a road are given, calculating orientation parameters of the surveillance camera based on the positions of the reference points on the screen, and detecting a physical quantity of the object based on a photographed image of the object using the orientation parameters.

According to the foregoing structure, in the automatic monitoring mode, the image processing apparatus recognizes on a screen a plurality of reference points whose locations on the road are given, calculates orientation parameters of the surveillance camera based on the positions of the reference points on the screen, and detects a physical quantity of the object based on a photographed image of the object using the orientation parameters. With this arrangement, orientation parameters are accurately calculated, allowing physical quantities such as the position and speed of the object to be measured accurately.

The arrangement may be such that the surveillance camera is fixed to a preset position in the automatic monitoring mode. This allows images to be automatically monitored constantly with the same field of view. Also in this case, there may be an error in the orientation parameters when switching the mode from the manual remote operation mode to the automatic monitoring mode. However, owing to the aforementioned function of the image processing apparatus, orientation parameters can be calculated accurately, allowing physical quantities such as the position and speed of the object to be measured accurately.

It is preferable that the preset position can be initially set manually on the image processing apparatus so that the operator can previously select an optimum field of view for automatic monitoring. The number of selectable preset positions may be one or two or more.

It is preferable that zoom magnification can be set to any desired value by manual remote operation from the camera operation section so that if an abnormality occurs during the automatic monitoring, the operator can zoom in on the image to closely observe the state of the abnormality.

Setting for switching between the manual operation mode and automatic monitoring mode may be performed in the camera operation section.

Switching to the manual operation mode is preferably performed automatically in response to a remote control operation of the camera in the camera operation section as a trigger. If an abnormality phenomenon occurs during the automatic monitoring, the mode automatically switches to the manual operation mode in response to the operator's operation of the camera, so that labor of the operator can be reduced.

The aforementioned orientation parameters include, for example, rotation angles around two horizontal axes and a rotation angle around a vertical axis of the turntable. However, they are not limited to the above-mentioned ones but may be, for example, a rotation angle around the optical axis of the camera lens (roll), yaw and pitch angles. In short, parameters by which the orientation of the camera can be specified may be used.

The aforesaid physical quantity represents a position or motion of the object. It is preferable that the image processing apparatus further has a function of detecting occurrence of a phenomenon based on a detected position or motion of the object. This allows occurrence of phenomena to be automatically detected as a result of image processing.

When the object is a vehicle on a road, the image processing system of the present invention can be applied to road monitoring, and when the physical quantity of the object to be detected is the traveling speed of a vehicle, the image processing system of the present invention can be applied to speed monitoring of a vehicle. In addition, when the phenomenon to be detected by the image processing apparatus is traffic congestion, it can be applied to traffic flow monitoring.

As described so far, according to the present invention, in the automatic monitoring mode, the image processing apparatus recognizes on a screen a plurality of reference points whose locations on a road are given, calculates orientation parameters corresponding to rotation angles of the surveillance camera based on the positions of the reference points on the screen, and detects a physical quantity of the object based on a photographed image of the object using the orientation parameters. Thus, orientation parameters are accurately calculated, allowing physical quantities such as the position and speed of the object to be measured accurately. As a result, even if an error occurs in the orientation of the surveillance camera when switching the mode from the manual operation mode to the automatic monitoring mode, such an error is permissible. Accordingly, it is not necessary to provide the turntable with a precise tracking mechanism, so that the whole structure of the image processing system can be constructed easily at low cost.

DETAILED DESCRIPTION OF THE INVENTION

A specific embodiment of the present invention will be hereinafter described in detail with reference to the appended drawings.

Figure 1:
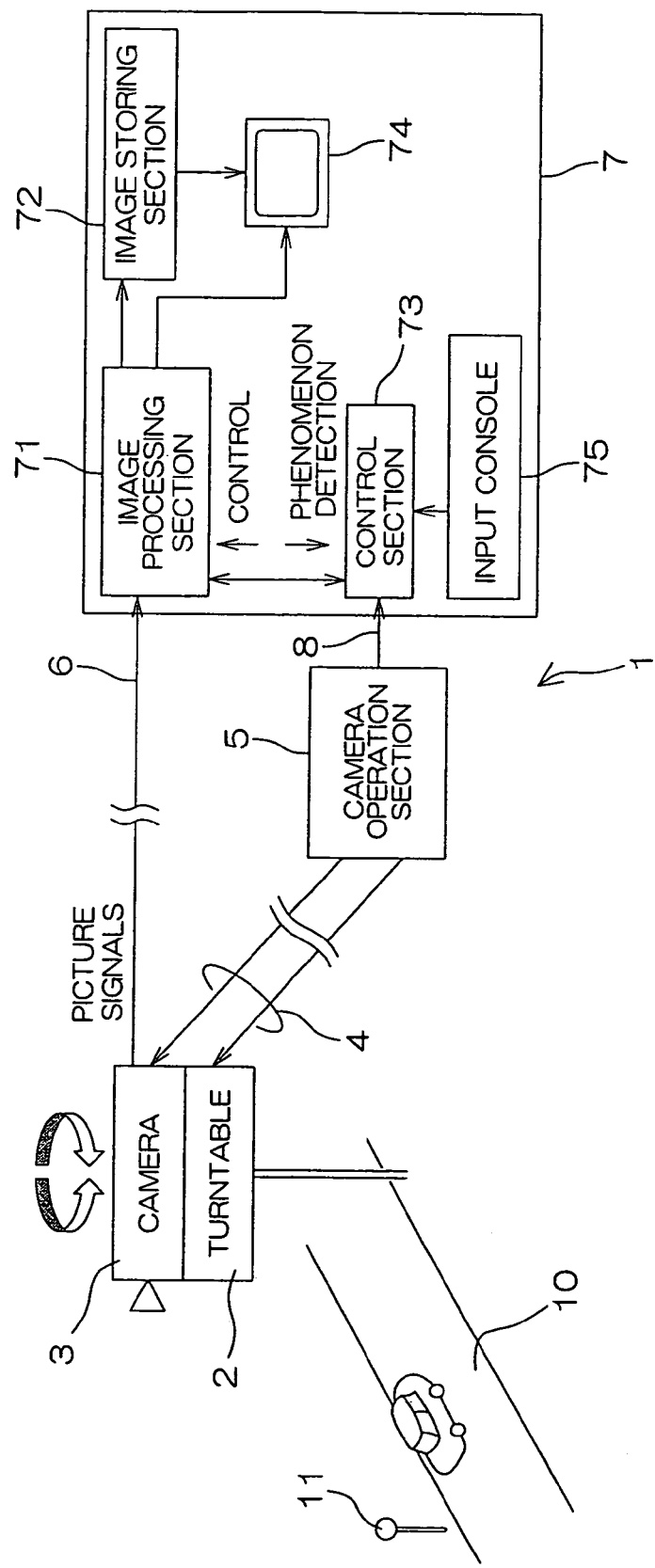
FIG. 1 is a schematic diagram showing the configuration of an image processing system 1 using a rotatable surveillance camera 3 according to the present invention.

FIG. 1 is a schematic diagram showing the configuration of an image processing system 1 using a surveillance camera 3 according to the present invention.

The image processing system 1 is used for monitoring road traffic, and provided with combined functions including a function of automatically monitoring phenomena such as traffic congestion at a fixed field of view and a function of photographing the road with any desired field of view by manual remote operation.

The image processing system 1 is fixed, for example, to a location overlooking a road 10, and includes a turntable (also called "camera platform") 2 for varying the orientation of a surveillance camera 3, and the surveillance camera 3 mounted on the turntable 2.

The turntable 2 can be rotated by a motor about two horizontal axes and a vertical axis. The angles of rotation are remote controllable. The focal length and zoom magnification of the surveillance camera 3 can also be set by remote control. These remote control operations are performed in a camera operation section 5 through a communication line 4.

Picture signals of the surveillance camera 3 are fed to an image processing apparatus 7 in a central section through a wire or wireless communication line 6.

The image processing apparatus 7 includes an image processing section 71, an image storing section 72, a control section 73, a monitoring device 74 and an input console 75.

The monitoring device 74 is provided for monitoring pictures formed according to the picture signals fed to the image processing apparatus 7 through the communication line 6. The control section 73 performs operation control of the whole system 1 such as communication control and input/output control. The input console 75 is provided for manual input for various settings required for the operation of the system 1, and includes a mouse and arrow keys.

The image processing section 71 executes functions related to the present invention. A part or all of the functions are effected by execution of programs stored in predetermined media such as CD-ROM and hard disc by the computer of the image processing apparatus 7.

Based on the data of an image taken by the surveillance camera 3, the image processing section 71 recognizes reference points, which are points serving as references on the road, calculates orientation parameters of the surveillance camera 3 based on the actual positional information of these reference points and the positions thereof on a screen, and detects vehicles and their positions on the road 10 using the calculated orientation parameters and based on image data of the vehicles photographed by the surveillance camera 3.

Based on the positions of the vehicles detected as above, the image processing section 71 calculates traffic-related physical quantities including traffic volume (the number of vehicles passing through per unit time), vehicle speed (when detecting a plurality of vehicles, the average speed of all the vehicles) and occupancy. Here, the occupancy includes temporal occupancy and spatial occupancy. Temporal occupancy is the quotient of $\Sigma t_k$ divided by T: $\Sigma t_k/T$, where T is a period of time during which vehicles pass through the vehicle sensor 3, $t_k$ represents time that each vehicle takes to pass through the sensor 3, and $\Sigma t_k$ represents the sum of $t_k$. Spatial occupancy is the quotient of $\Sigma m_k$ divided by L: $\Sigma m_k/L$, where $m_k$ represents the length of a vehicle, L represents the length of the road, and $\Sigma m_k$ represents the sum of $m_k$. The subscript k represents each vehicle.

Then, based on these traffic-related physical quantities, the image processing section 71 monitors to see if a particular phenomenon (e.g. congestion, stationary or low-speed vehicles, continual lane changes etc.) is occurring. If the occurrence of a phenomenon is detected, the image processing section 71 notifies the operator of the occurrence of the phenomenon via a speaker, sign lamp or the like (not shown).

The system 1 has an image storing function to store image data before and after the occurrence of an abnormality detected automatically into the image storing section 72 for a predetermined period of time.

In addition, a camera operation section 5 for remote control operation of the surveillance camera 3 and the turntable 2 is provided in proximity to the image processing apparatus 7. The camera operation section 5 is connected to the turntable 2 and surveillance camera 3 through the communication lines 4. Orientation control signals from the camera operation section 5 are transmitted to the turntable 2 through the communication line 4, and zoom magnification signals and focus-changing signals are transmitted to the surveillance camera 3 through the communication line 4. This enables remote controlling of the zoom magnification and focal length of the surveillance camera 3 and the orientation of the turntable 2. Additionally, a preset switch is provided in the camera operation section 5 as described later.

Now, the operation of this system is described.

(1) Initial Mode

Initial mode is a mode for performing initial settings. When the operator sets the initial mode via input console 75, the system 1 enters the initial mode.

Figure 2:
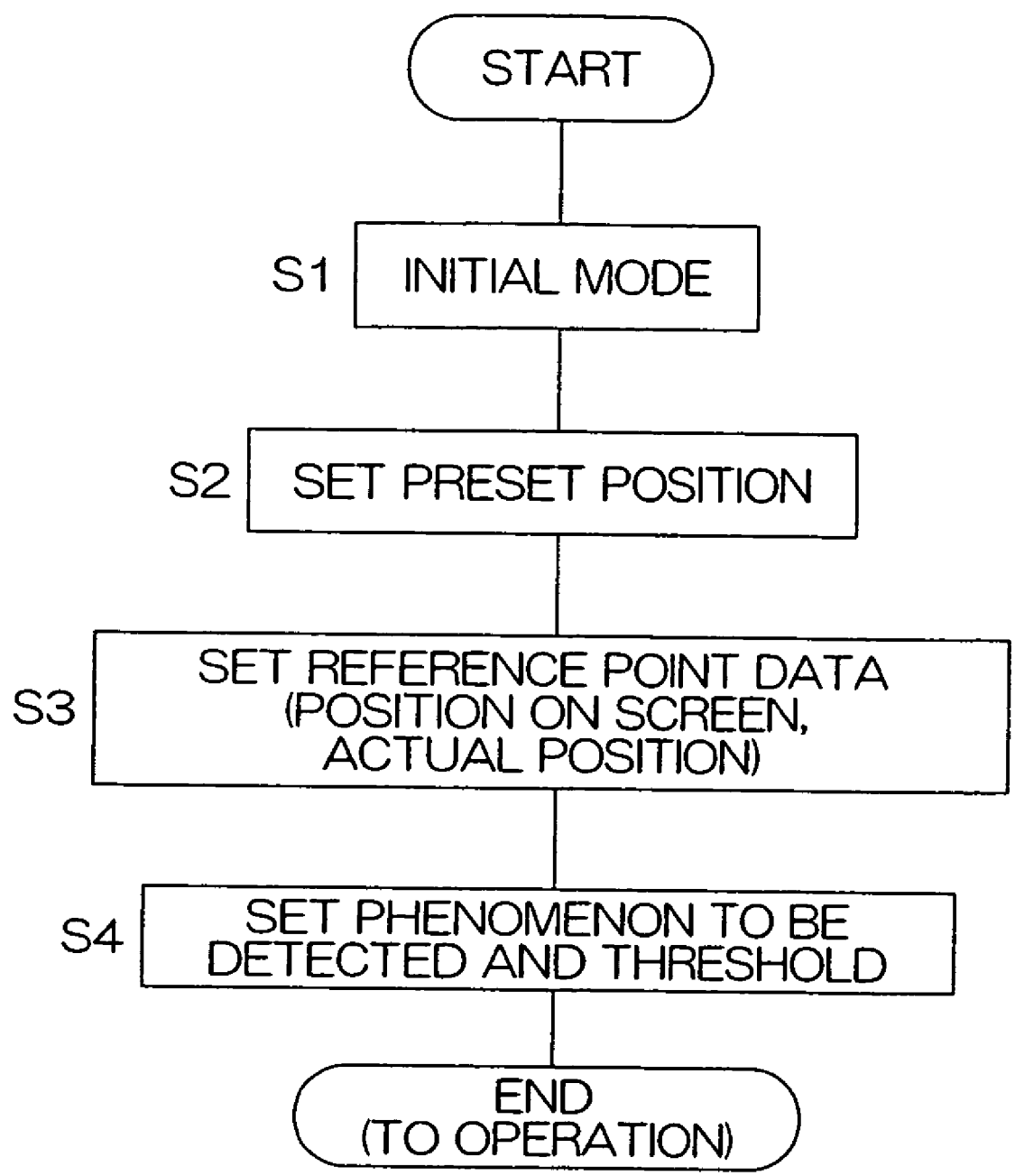
FIG. 2 is a flowchart illustrating setting steps in an initial mode.

FIG. 2 is a flowchart showing the setting steps in the initial mode.

In the initial mode (Step S1), the operator sets orientationparameters, focal length, zoom magnification etc. for the surveillance camera 3 via the input console 75 (Step S2). These orientation parameters, focal length, zoom magnification and the like are collectively referred to as "preset position of the surveillance camera". Meanwhile, the setting of the focal length may be omitted in cases where the focal length of the optical system of the surveillance camera 3 is fixed. The field of vision or scope (referred to as "field of view") of the picture is uniquely determined corresponding to the preset position. The operator can also set a plurality of such preset positions.

The advantage of setting the preset position is that it enables automatic monitoring with a predetermined field of view, so that it is possible to obtain sequential data over a long period. In addition, since setting of a plurality of preset positions is possible, a plurality of places including roads and slopes can be automatically monitored by shifting the preset position one after another.

Subsequently, reference points at the preset position on the screen, which are references to identify the positions of stationary objects such as traffic signs by the road, white lines dividing traffic lanes, road signs and guardrails, are set (Step S3). Then, information of the actual positions of the reference points (absolute coordinate data or data of relative distance and angle with respect to the surveillance camera 3) is entered.

Now, a process for determining the positions of reference points is described for the case where traffic signs by the road are used as the reference points. The traffic signs are represented by poles, which are referred to as "reference poles".

Figure 3:
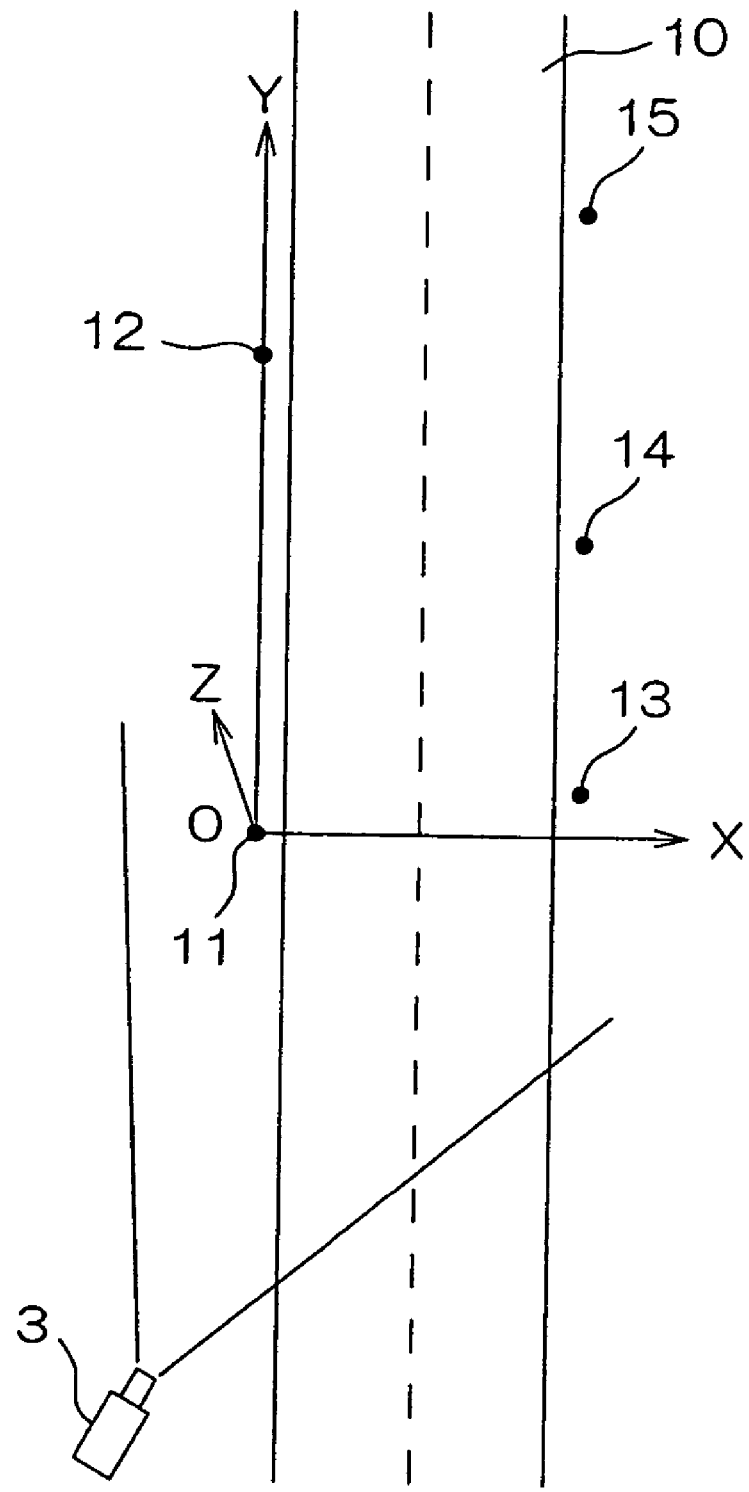
FIG. 3 is a plan view of a road showing reference poles 11-15 located by the road.

FIG. 3 is a plan view of a road illustrating reference poles 11-15 located by the road. A road coordinate system (X, Y, Z) with the origin located at a predetermined position of the road (for example, the position of the foot of the reference pole 11) is defined as follows: As shown in FIG. 3, X axis runs horizontally across the road, Y axis runs along the road, and Z axis runs in the vertical direction (in the direction orthogonal to the sheet). The coordinate values (X, Y, Z) (Z represents the height of each pole) of the reference poles 11-15 in the road coordinate system are accurately determined by actual measurement.

If coordinate values of some poles (for example, poles 11 and 12) are measured together with distances (for example, a distance L13 between the pole 11 and pole 13 and a distance L23 between the pole 12 and pole 13 etc.), the coordinate values of other poles (for example, pole 13) can be obtained by calculation utilizing trigonometric functions. The measurement can therefore be simplified.

In this manner, the respective coordinate values (X, Y, Z) of the reference points are determined.

Subsequently, a phenomenon (such as congestion, stationary or low-speed vehicles, or continual lane changes) for which automatic monitoring is desired and its detection threshold are set as initial settings (Step S4). To take congestion as an example, the object of detection is vehicle speed, and the detection threshold is set to 10 km/hr, for instance.

(2) Manual Monitoring Mode

Figure 4:
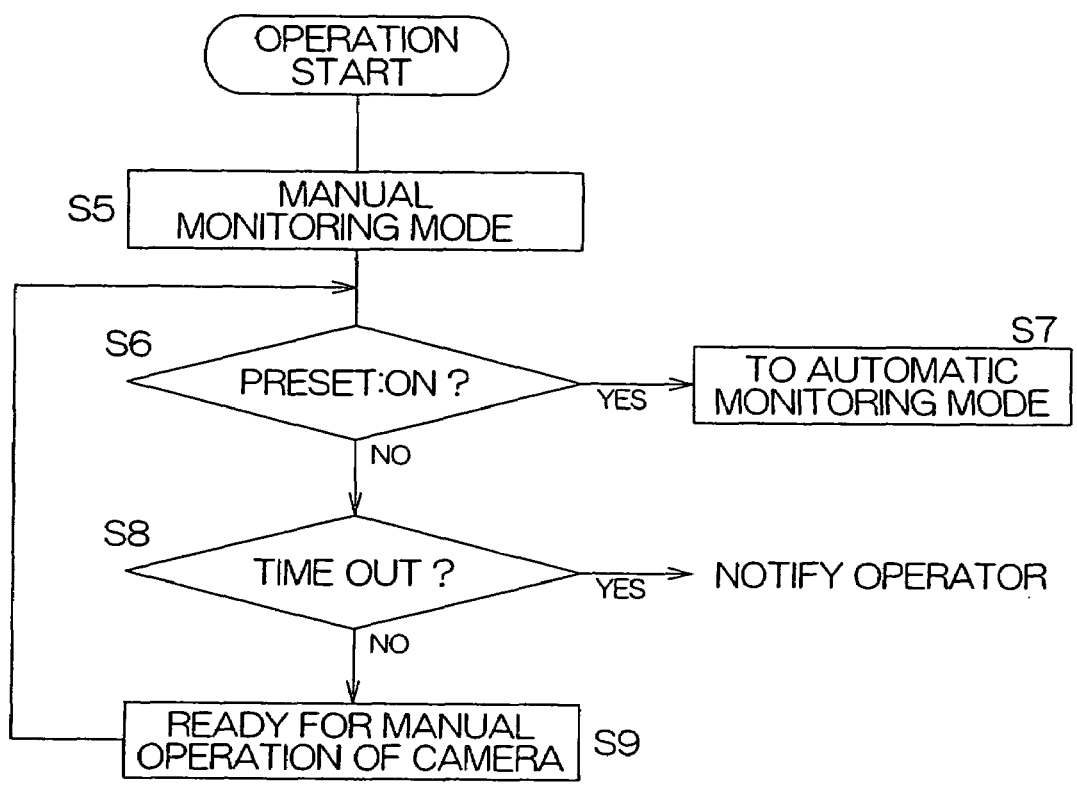
FIG. 4 is a flowchart illustrating operation steps in a manual operation mode.

After completion of the initial settings, the system operates in a manual monitoring mode as shown in the flowchart in FIG. 4 (Step S5). The "manual monitoring mode" here refers to a mode in which the operator performs visual monitoring by remote controlling the surveillance camera 3. The operator operates the camera operation section 5 to set the zoom magnification, pan angle and tilt angle to desired values. As a result, the operator can take pictures at the desired magnification and with the desired field of view. Meanwhile, while the camera operation section 5 is operated, a signal indicating that the camera operation section 5 is being operated (referred to as "camera operation signal") is transmitted from the camera operation section 5 to the image processing apparatus 7 through the communication line 4. Based on the signal, the control section 73 instructs the image processing section 71 to discontinue the image processing.

In this condition, when the above-mentioned preset switch is turned on (Step S6), the surveillance camera is automatically rotated to the preset position set in the initial mode and fixed thereto. In addition, the signal indicative of the manual monitoring being performed is canceled, and the image processing function starts operating (Step S7). A more specific description of this image processing function will be given later.

If a plurality of preset positions have been set in the initial mode, the operator selects one preset position from them in Step S6. As a result, the surveillance camera 3 is automatically rotated to the selected preset position, and fixed thereto.

In cases where the camera operation signal is not received by the image processing apparatus 7 for a predetermined period of time, the operator is notified that the surveillance camera 3 is being operated in the manual monitoring mode so that the operator cancels the manual monitoring mode to switch to the automatic monitoring mode (Steps S8, S9)

(3) Automatic Monitoring Mode

Figure 5:
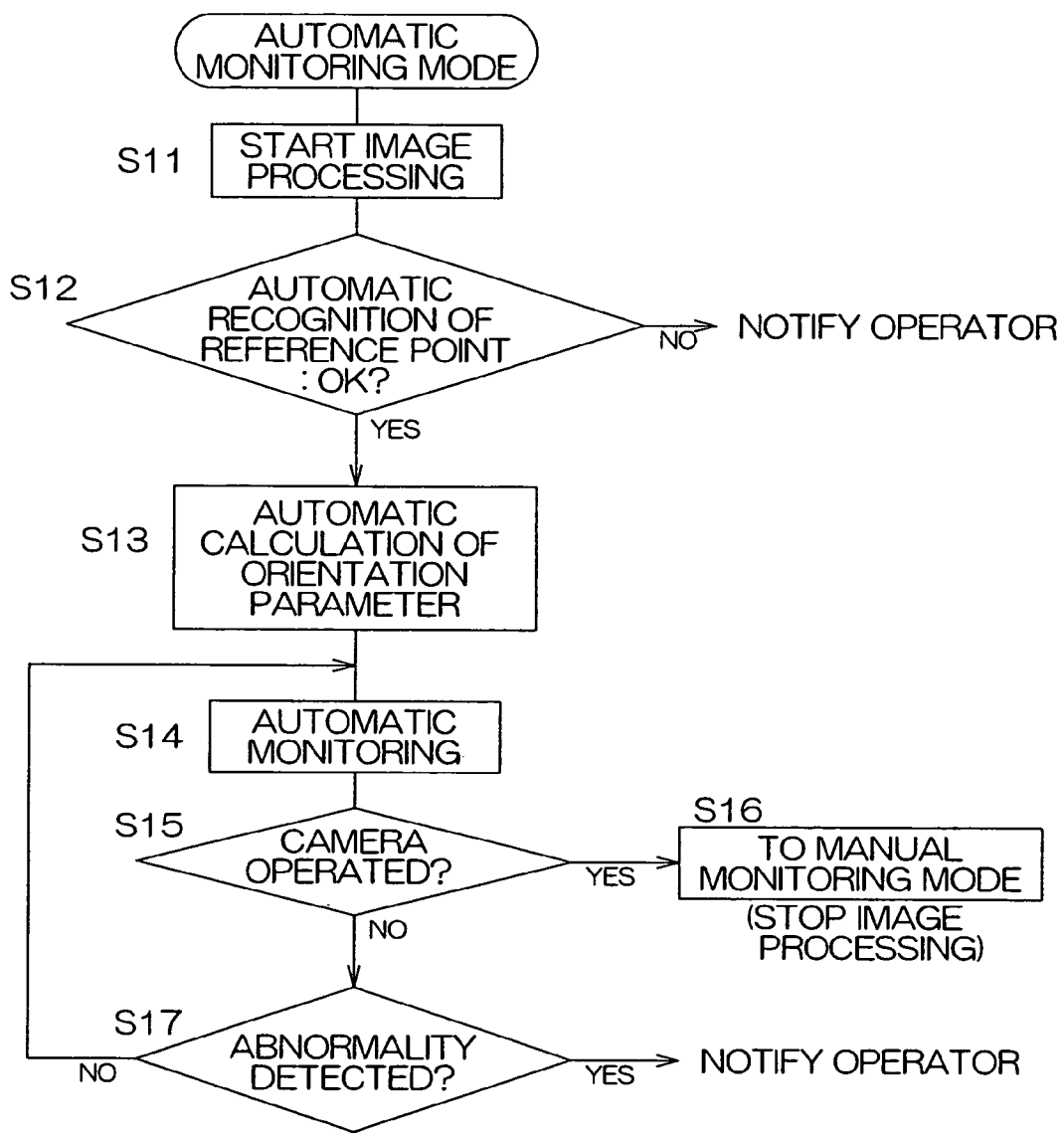
FIG. 5 is a flowchart illustrating processing steps in an automatic monitoring mode.

FIG. 5 is a flowchart illustrating processing steps in the automatic monitoring mode.

When the system enters the automatic monitoring mode, the image processing function of the image processing section 71 starts operating (Step S11), and automatic recognition of the reference points set in the initial mode is started (Step S12). For recognition of the reference points, several approaches are employed, including obtaining correlation between the present reference points and those in the previous automatic monitoring mode, recognizing corners of a plurality of feature points as the reference points, a method combining these, and a method based on linear trajectories of vehicles.

For example, in the method cited as "recognizing corners", brightness gradients in vertical, horizontal and diagonal directions are calculated, and convolution in the vertical and horizontal directions is performed so that longitudinal, lateral and diagonal edges are emphasized. Then, feature quantities representing corners, which are the points at which the edges cross, are calculated, thereby recognizing the corners (Shi, Tomasi "Good Features to Track" IEEE Conference on Computer Vision and Pattern Recognition (CVPR94)Seattle, June 1994).

Incidentally, referring to FIG. 5, in cases where automatic recognition of the reference points is not achieved after a lapse of a predetermined time from the start of image processing, the system outputs an alarm indicative of automatic monitoring being impossible to notify the operator thereof.

When automatically recognizing the reference points in the screen, the image processing section 71 calculates orientation parameters at the preset position based on the initially set positional data (X, Y, Z) of the reference points (Step S13). The reason for calculating orientation parameters is explained as follows: When the preset switch is turned on, as described previously, the surveillance camera 3 is automatically rotated to the preset position set in the initial mode and fixed thereto. During this process, an angle error occurs. Therefore, it is determined that the preset information is not relied on as it is, and image processing based on the reference points recognized in the screen is carried out so that orientation parameters are automatically calculated. Meanwhile, since the above-mentioned angle error is on the order of 0.5 degrees, it cannot be compensated for by rotating the surveillance camera 3 again. Calculation of the orientation parameters is therefore performed by image processing using data without moving the surveillance camera 3.

Figure 6:
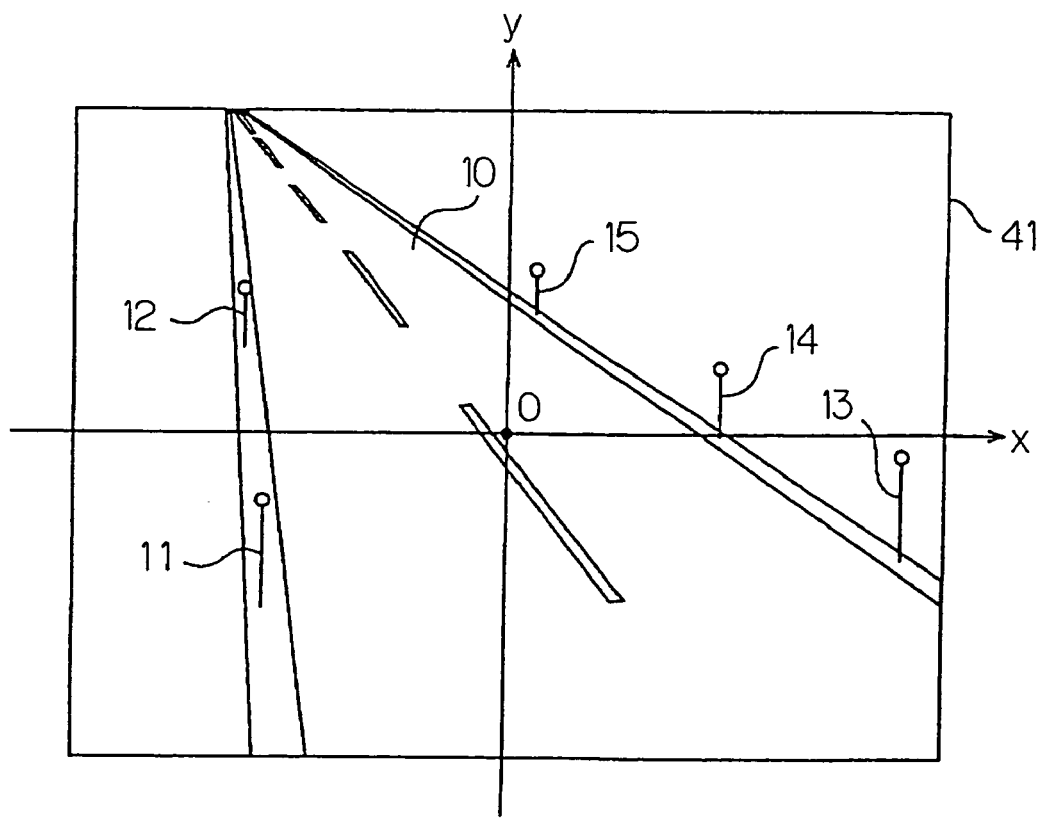
FIG. 6 is a screen showing a picture of a road taken by the surveillance camera 3.

The calculation process of the orientation parameters will be specifically described below. FIG. 6 is a screen showing a picture of a road taken by the surveillance camera 3. The coordinate system (x, y) of the screen is defined such that with the origin set at the center of the screen 41, x-axis is in the horizontal direction and y-axis is in the vertical direction of the screen.

Figure 7:
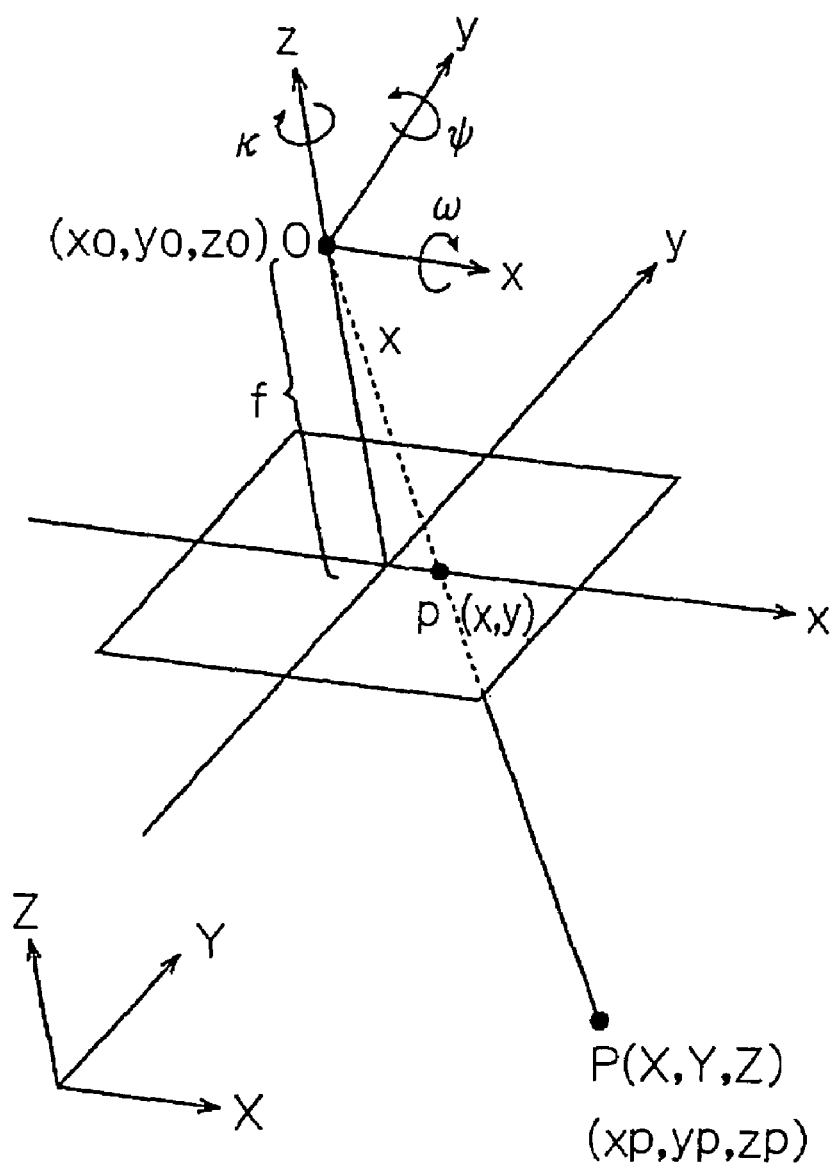
FIG. 7 illustrates the relationship between a coordinate system (X, Y, Z) of the road and a coordinate system (x, y, z) of the surveillance camera 3.

FIG. 7 illustrates the relationship between the road coordinate system (X, Y, Z) and the coordinate system (x, y, z) of the surveillance camera 3. A photographing position (camera position) O of the surveillance camera 3 in the road coordinate system is represented by (X0, Y0, Z0). It is assumed that the coordinate system of the surveillance camera 3 is rotated counterclockwise by an angle of κ with respect the positive direction of the Z-axis, counterclockwise by an angle of φ with respect to the positive direction of the Y-axis, and counterclockwise by an angle of co with respect to the positive direction of the X-axis.

As shown in FIG. 7, a point P (X, Y, Z) in the road coordinate system is represented by (xp, yp, zp) in the coordinate system of the surveillance camera 3. The relationship between the road coordinate (X, Y, Z) and the surveillance camera 3 coordinate (xp, yp, zp) at the point P is expressed using ω, φ and κ as the following equation [eq.1]:

$$\begin{bmatrix} xp \\ yp \\ zp \end{bmatrix} = \begin{bmatrix} 1 & 0 & 0 \\ 0 & \cos\omega & -\sin\omega \\ 0 & \cos\omega & \cos\omega \end{bmatrix} \begin{bmatrix} \cos\psi & 0 & \sin\psi \\ 0 & 1 & 0 \\ -\sin\psi & 0 & \sin\psi \end{bmatrix} \begin{bmatrix} \cos\kappa & -\sin\kappa & 0 \\ \sin\kappa & \cos\kappa & 0 \\ 0 & 0 & 1 \end{bmatrix} \quad [\text{eq. 1}]$$

$$\begin{bmatrix} X - X0 \\ Y - Y0 \\ Z - Z0 \end{bmatrix}$$

Since the photographing position O (X0, Y0, Z0), the point P (X, Y, Z) and a map p (x, y) that is projected on a screen at the distance of a focal length of f from the photographing position O are in alignment with one another, the following equations [eq.2] [eq.3] are obtained.

$$x = -f \cdot \frac{xp}{zp} \quad [\text{eq. 2}]$$

$$y = -f \cdot \frac{yp}{zp} \quad [\text{eq. 3}]$$

Eliminating xp, yp and zp from the equations [eq.2] [eq.3] and [eq.1] above gives the following equations [eq.4] [eq.5]:

$$x = -f \frac{a11(X-X0) + a12(Y-Y0) + a13(Z-Z0)}{a31(X-X0) + a32(Y-Y0) + a33(Z-Z0)} \quad [\text{eq. 4}]$$

$$y = -f \frac{a21(X-X0) + a22(Y-Y0) + a23(Z-Z0)}{a31(X-X0) + a32(Y-Y0) + a33(Z-Z0)} \quad [\text{eq. 5}]$$

where f is the focal length of the surveillance camera 3, $a_{11}=\cos\phi\sin\kappa$, $a_{12}=-\cos\phi\sin\kappa$, $a_{13}=\sin\phi$, $a_{21}=\cos\omega\sin\kappa+\sin\omega\sin\phi\cos\kappa$, $a_{22}=\cos\omega\cos\kappa-\sin\omega\sin\phi\sin\kappa$, $a_{23}=-\sin\omega\cos\phi$, $a_{31}=\sin\omega\sin\kappa-\cos\omega\sin\phi\cos\kappa$, $a_{32}=\sin\omega\cos\kappa+\cos\omega\sin\phi\sin\kappa$, and $a_{33}=\cos\omega\sin\phi$.

The symbols f, X0, Y0, Z0, κ, φ and ω are parameters relating to photographing conditions of the surveillance camera 3, in which ω, φ and ω are orientation parameters.

Since the surveillance camera 3 is mounted on the turntable 2, it is assumed that X0, Y0 and Z0 are fixed values and the focal length f is a given value. The coordinate values (X, Y, Z) of the reference poles are also given. The coordinates (x, y) of the reference poles on the screen have been given by the image recognition as mentioned above. Consequently, unknown values are κ, φ and ω, which, theoretically, will be found by solving the equations [eq.4] [eq.5]as a simultaneous equation each for three reference poles.

As one of the methods for solving such a nonlinear simultaneous equation as [eq.4] [eq.5], the Newton-Laplace theory is used.

The Newton-Laplace theory is a method in which approximate values are given to unknown variables of the nonlinear equations, which are expanded in a Taylor series about the approximate values to yield linear equations. Then compensation values are determined by a least squares method so that the approximate values are corrected. The correction procedure is repeated until converged solutions are obtained.

By the calculation as above, the orientation parameters κ, φ and ω can be determined based on the coordinates (x, y) on the screen of the reference poles.

From this step on, the image processing section 71 continues to be in the state of automatic monitoring (Step S14). That is, the image processing section 71 processes images of vehicles passing through thereby to calculate the "traffic-related physical quantities" mentioned above.

Figure 8:
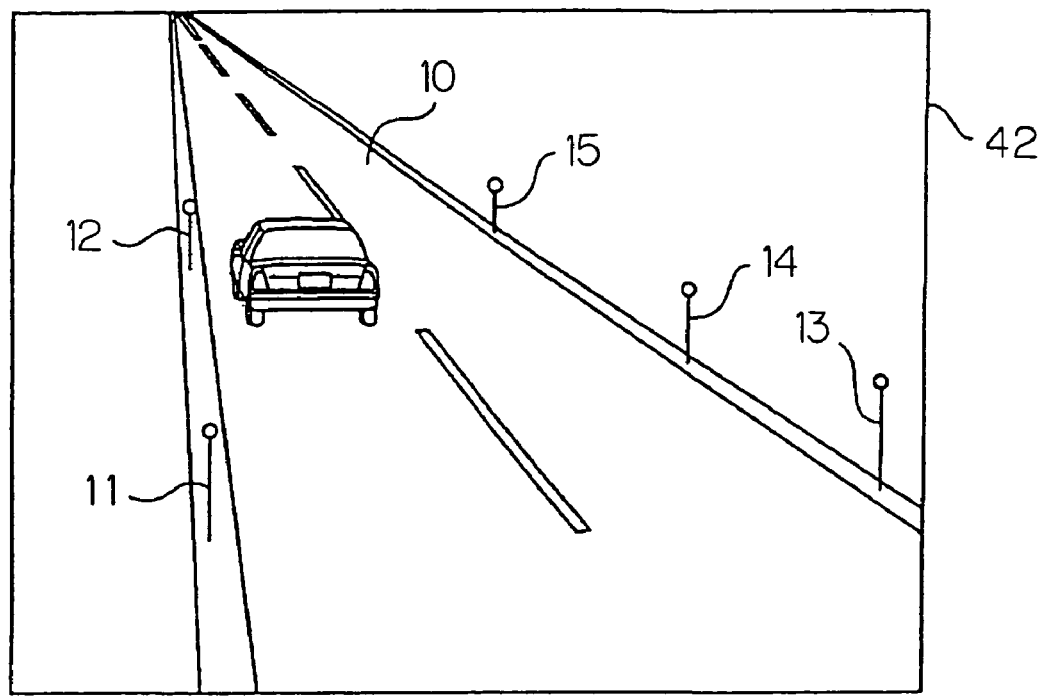
FIG. 8 is an example screen showing a picture of a vehicle taken by the surveillance camera 3.

Now, a case where the speed of a vehicle is calculated is described as an example. Picture signals of the surveillance camera 3 are inputted through the communication line into the image processing section 71, where image data of the photographed vehicle are obtained. FIG. 8 is an example screen 42 showing a picture of a vehicle taken by the surveillance camera 3. Since the orientation parameters such as κ, φ and ω have been determined, reference positions 11-15 may remain unphotographed.

Based on the image data, the image processing section 71 detects the vehicle. As the method for detecting a vehicle, for example, a space finite-difference method is employed. In the space finite-difference method, edge portions at which abrupt changes in brightness level occur are detected on the screen. Then, binarization is performed. Based on the results of the binarization, pattern matching is performed so as to detect the vehicle. For detection of a vehicle, other methods including a time finite-difference method in which pictures that have a time difference are compared may be used.

A feature of the vehicle (for example, a ground contact point of a rear wheel) is extracted from a picture thereof and its screen coordinate values (x, y) are calculated. For the calculation, the equations [eq.6] [eq.7] below are used. By substituting the screen coordinate values (x, y) and a height z=0 into the equations, the road coordinate (X, Y, Z) of the feature of the vehicle can be found.

$$X = (Z - Z0)\frac{a11x + a21y - a31f}{a13x + a23y - a33f} + X0 \quad [eq.\ 6]$$

$$Y = (Z - Z0)\frac{a12x + a22y - a32f}{a13x + a23y - a33f} + Y0 \quad [eq.\ 7]$$

Thereafter, based on another picture obtained after a lapse of a predetermined time from the time at which the first picture is taken, the position of the same vehicle is detected. By determining the relative distance traveled by the vehicle from the present position of the vehicle and the position thereof before the lapse of the predetermined time, the speed of the vehicle can be obtained.

High accuracy is required for velocity data for the judgment of congestion or the like. The present invention is characterized in that velocity detection with high accuracy is enabled by calculating the orientation parameters accurately based on the reference points.

Based on the traffic-related physical quantities, the image processing section 71 detects a preset phenomenon, namely, congestion, stationary or low-speed vehicles, continual lane changes or the like. When the object of detection is congestion, for example, the detection is carried out by comparing the detected velocity with a threshold.

When a phenomenon is detected in such a way, it is notified to the operator by an alarm or displaying an abnormality warning on the monitor (Step S17). At this point, the operator is also allowed to check images before and after the occurrence of the phenomenon via the monitoring device 74.

When the operator operates (for zooming, panning, or tilting) the camera operation section 5 after receiving the abnormality warning so as to check the abnormality, in response to the operation, the system exits the automatic monitoring mode and automatically switches to the manual monitoring mode (Step S15→S16).

It is also possible to provide and deliver the images during the automatic monitoring mode to the Internet.

While a specific embodiment of the present invention has been described, the implementation of the present invention is not limited to the forgoing embodiment. For example, while the forgoing embodiment is arranged such that one or a plurality of preset positions are determined in the initial mode so that the surveillance camera 3 automatically returns to a selected preset position when the mode is switched to the automatic monitoring mode, the present invention may also be implemented without setting such preset positions.

In cases where preset position setting is not carried out, the operator fixes the orientation of the surveillance camera 3 to a desired orientation (for example, to an angle that allows an overlooking view of the entire road) when switching the mode from the manual monitoring mode to the automatic monitoring mode. In this condition, the image processing section 71 recognizes the reference points on the screen and calculates the orientation parameters. Thereafter, the system enters a monitoring mode for detecting vehicles passing through. When preset position setting is not carried out as in this case, while it becomes impossible to constantly maintain the same field of view for monitoring a phenomenon such as congestion, software and hardware elements required for the preset position setting can be omitted. This leads to the advantage of simplified configuration of the whole system.

Additionally, it should be understood that various other modifications may be made within the scope of the present invention.

The invention claimed is:

1. An image processing system using a rotatable surveillance camera comprising: a surveillance camera rotatably mounted on a turntable; an image processing apparatus; and a camera operation section,
    wherein the system allows mode setting to be switched between an automatic monitoring mode for automatically monitoring an object by means of image processing and a manual operation mode that enables acquisition of a picture taken by the surveillance camera with any desired field of view allowed by the specifications of the camera by manual remote operation from the camera operation section, and
    the image processing apparatus in the automatic monitoring mode has a function of recognizing on a screen a plurality of reference points whose locations on a road are given, calculating orientation parameters of the surveillance camera based on the positions of the reference points on the screen, and detecting a position or motion of the object based on a photographed image of the object using the orientation parameters.

2. The image processing system according to claim 1, wherein the surveillance camera can be fixed to a preset position in the automatic monitoring mode.

3. The image processing system according to claim 2, wherein the preset position can be initially set manually on the image processing apparatus.

4. The image processing system according to claim 1, wherein zoom magnification can be set to any desired value allowed by the specifications of the camera by manual remote operation from the camera operation section.

5. The image processing system according to claim 1, wherein setting for switching between the automatic monitoring mode and the manual operation mode is performed in the camera operation section.

6. The image processing system according to claim 5, wherein switching to the manual operation mode is automatically effected in response to a remote control operation of the surveillance camera performed in the camera operation section.

7. The image processing system according to claim 1, wherein the orientation parameters comprise rotation angles around two horizontal axes and a rotation angle around a vertical axis of the turntable.

8. The image processing system according to claim 1, wherein the image processing apparatus further has a function of detecting occurrence of a phenomenon based on the position or motion of the object.

9. The image processing system according to claim 1, wherein the object is a vehicle on a road.

10. The image processing system according to claim 9, wherein the physical quantity of the object to be detected in the image processing apparatus is a traveling speed of the vehicle.

11. The image processing system according to claim 10, wherein the phenomenon to be detected in the image processing apparatus is traffic congestion.

* * * * *